(12) United States Patent
Hsu et al.

(10) Patent No.: US 7,292,010 B2
(45) Date of Patent: Nov. 6, 2007

(54) ENERGY ATTENUATING DEVICE WITH THE DYNAMICAL AND ADAPTIVE DAMPING FEATURE

(75) Inventors: Yen-Weay Hsu, 5F, No. 4, Lane 384, Lung Chiang Rd., Taipei (TW); Tsun-Cheng Lin, 4F, No. 19-3, Chung Shan Rd., Ying-Ko Chen, Taipei Hsien (TW); Jiunn-Huei Chen, Nan-Tou Hsien (TW); Ying-Yin Ting, Taipei (TW)

(73) Assignees: Yen-Weay Hsu (TW); Tsun-Cheng Lin (TW)

( * ) Notice: Subject to any disclaimer, the term of this patent is extended or adjusted under 35 U.S.C. 154(b) by 150 days.

(21) Appl. No.: 11/294,417

(22) Filed: Dec. 6, 2005

(65) Prior Publication Data
US 2006/0087292 A1 Apr. 27, 2006

Related U.S. Application Data

(63) Continuation-in-part of application No. 10/765,869, filed on Jan. 29, 2004, now abandoned.

(51) Int. Cl.
*H02P 9/04* (2006.01)
*H02P 9/14* (2006.01)

(52) U.S. Cl. ............................. 322/37; 322/99; 322/95; 310/77

(58) Field of Classification Search .................... 322/7, 322/14, 24, 37, 99; 310/77; 361/166, 160
See application file for complete search history.

(56) References Cited

U.S. PATENT DOCUMENTS

| | | | | |
|---|---|---|---|---|
| 3,450,444 A | * | 6/1969 | Ballard | 303/189 |
| 3,469,662 A | * | 9/1969 | Dewar | 188/181 A |
| 3,507,544 A | * | 4/1970 | Ando et al. | 303/177 |
| 3,666,039 A | * | 5/1972 | Bachle et al. | 180/197 |
| 5,488,287 A | * | 1/1996 | Kemner et al. | 322/20 |
| 5,585,711 A | * | 12/1996 | Kemner et al. | 322/46 |
| 5,621,604 A | * | 4/1997 | Carlson | 361/166 |
| 5,726,558 A | * | 3/1998 | Umeda et al. | 322/27 |
| 6,184,604 B1 | * | 2/2001 | Takano et al. | 310/77 |

* cited by examiner

*Primary Examiner*—Nicholas Ponomarenko
(74) *Attorney, Agent, or Firm*—Hershkovitz & Associates, LLC; Abe Hershkovitz

(57) ABSTRACT

A new methodology for dealing with the Electric-Magnetic Anti-skid Braking System (EMABS) and recycling the regenerating energy on braking is proposed. Developing a dynamic damper which comprising positive and negative type resistors connected in series becomes a fast switch with adaptation, attenuation and fast recovery system properties, is a crucial turnkey. For braking purpose, the most general configuration is to couple the fast switches to the stator and rotor coils in an AC alternator that is driven by the vehicle's wheels or propellers. After performing the dynamic impedance matching in this braking system, the EMABS effect and recycling of the regenerating energy on braking are accordingly obtained.

6 Claims, 6 Drawing Sheets

ENERGY ATTENUATING DEVICE WITH THE DYNAMICAL AND ADAPTIVE DAMPING FEATURE

This is a continuation-in-part application of U.S. application Ser. No. 10/765,869 filed Jan. 29, 2004, now abandoned, the disclosure of which is expressly incorporated by reference herein in its entirety.

BACKGROUND OF THE INVENTION

1. Field of the Invention

The present invention relates to an energy attenuating device, more particularly, the energy attenuating device is applied to a braking system.

2. Description of Related Art

Theoretically, induced electromotive force (EF) in a magnetic field is contributed by many intrinsic factors, for example, the ratio of two coil loops (stator, rotor), the strength of magnetic flux, the time rate of flux, and so on. In the magnetic field with high flux strength, the magnitude of attractive force between rotor and stator is extremely high and related to the above factors. The attractive force is well known as the "magnetic reluctance (MR)".

For a braking system having a propeller and generators, after the magnetic coils such as wired coils on the rotor for the AC generator are excited, the magnetic reluctance force is so-called "braking effect".

For braking purpose, the generator is driven by a propeller in the vehicle. If the vehicle is travelling at high speed, the angular velocity of the propeller is large. At this moment, the rate of magnetic flux also changes positively proportion to the angular velocity of the propeller. When a magnetic field coil of the rotor is provided with highly flux density, a slight rotation of the coil or a little flux change can induce a high electromotive force. That is, when other conditions are constantly fixed, the strength of the induced electromotive force changes in proportion to the rate of the flux change. Any circuit and component may be destroyed by the high induced electromotive force or voltage shock. Consequently, a problem accordingly occurs in the electrical-magnetic braking system. That is, the induced high electromotive force will cause a break down in the braking system Up to now, the most commonly used solution for the voltage shock is to incorporate a voltage regulator into the braking system to regulate the magnitude of the current and to limit the current based on a pre-determined limiting threshold. The magnitude of the current in magnetic coil can be repressed so as to avoid the disaster resulted from the voltage shock. Hence, the magnetic reluctance force is also decreased, i.e. the braking force is dropped out.

In another solution for the high voltage shock, dissipating diodes are used as the dampers to consume the induced high electromotive force. Based on the concept of the energy transformation, the high speed vehicle is regarded as the vehicle with large kinetic energy. The braking of the high speed vehicle means the kinetic energy is transformed into heat or electrical energy. The temperature in the braking system increases very quickly so that a solution to absorb the heat effectively is necessary. Therefore, an additional air cooling or water cooling device has to be added into the braking system. In practice, many physical conditions should be considered, for instance, the space for mounting the cooling device, the safety and reliability of the cooling device, and so on. For example, a bus driver applies to braking just 3-5 seconds only when the brake petal is stepped on. Keeping the braking continuously is very difficult. For a high speed vehicle, the conventional braking system completely fails to carry out the braking task.

Theoretically, in the book of "K. L. Johnson; Contact Mechanics, Cambridge University Press., 1987, at pages 88-93, 96, 109, 120, 125, 248, 255, 279, 300", a effective Young's module $E^*$ is defined as $$\frac{1}{E^*} = \frac{1-v_1^2}{E_1} + \frac{1-v_2^2}{E_2} \quad (1)$$

Another parameter $k_m$ which is called mean curvature is defined as $$k_m = \frac{1}{2}\left(\frac{1}{R'} + \frac{1}{R''}\right) = \frac{1}{2}\left(\frac{1}{R_1} + \frac{1}{R_2}\right) \quad (2)$$

The contact size is related to the mean contact pressure $P_m$ and mean curvature $k_m$ as the following $$a \propto \left[\frac{P_m\left(\frac{1}{E_1}+\frac{1}{E_2}\right)}{\left(\frac{1}{R_1}+\frac{1}{R_2}\right)}\right]^{\frac{1}{3}} = \left[\frac{P_m\left(\frac{1}{E_1}+\frac{1}{E_2}\right)}{2k_m}\right]^{\frac{1}{3}} \text{ or} \quad (3)$$

$$P_m \propto \left[\frac{p\left(\frac{1}{R_1}+\frac{1}{R_2}\right)^2}{\left(\frac{1}{E_1}+\frac{1}{E_2}\right)^2}\right]^{\frac{1}{3}} = \left[\frac{p(2k_m)^2}{\left(\frac{1}{E_1}+\frac{1}{E_2}\right)^2}\right]^{\frac{1}{3}}$$

Based on the Hertz's solution for the point contact, we conclude that the following properties:

1. Contact size: a $$a = \left(\frac{3PR}{4E^*}\right)^{\frac{1}{3}} \quad (4)$$

2. Separation: $\delta$ $$\delta = \frac{a^2}{R} = \left(\frac{9P^2}{16R(E^*)^2}\right)^{\frac{1}{3}} \quad (5)$$

3. Maximized normal stress: $p_0$ $$p_0 = \frac{3P}{2\pi a^2} = \left(\frac{6P(E^*)^2}{\pi^3 R^2}\right)^{\frac{1}{3}} \quad (6)$$

4. Maximized shear stress: $\square$=0.57a $$\tau_{max} = 0.31 p_0 = 0.47 \frac{P}{\pi a^2} = \frac{0.47 P^{\frac{1}{3}}}{\pi}\left(\frac{4E^*}{3R}\right)^{\frac{2}{3}} \quad (7)$$

where P is the applied total normal force, R is equal to $$\frac{1}{k_m}$$

5. For the tangential contact case, the β is defined as $$\beta = \frac{1}{2}\left[\left(\frac{1-2v_1}{G_1}\right)-\left(\frac{1-2v_2}{G_2}\right)\right]/\left[\left(\frac{1-v_1}{G_1}\right)+\left(\frac{1-v_2}{G_2}\right)\right] \quad (8)$$

Furthermore, the absolute value of □ is almost less than 0.25, this constant is related to the coefficient of friction. Referred to (1), the coefficient of friction □ is always smaller than $$\frac{\beta}{5}, i.e.$$

$$0 < \square \le \frac{\beta}{5} \quad (9)$$

If the material properties (tires, road) $G_1$, $G_2$, $v_1$, $v_2$ and weight of the vehicle are fixed, the friction force $f$, at the contact patch never changes.

$$f_r = \square P \le \frac{\beta P}{5} \quad (10)$$

To see more details of the dynamic behaviors of braking system, refer to the thesis [P. W. Zegelaar. The dynamic response of types to brake torque variations and road univennesss Delft University of Technology., 1998]. By this way, with reference to equations (4), (5), (6) and (7), the contact size □ varied with magnitude of normal force is also a constant value. That is, the braking force is almost a constant value except from the numbers of tires and the weight of the vehicle increased. From the viewpoint of tribology (wear, friction and lubrication), a quite obvious limitation is that the braking force is not enough to block the high speed motion in the vehicle systems.

Some different kinds of design for eliminating the side effects of the bottleneck are required so as to elevate the safety of high speed vehicle and to provide the basic implementation issues of the energy recycling on braking. The voltage shock should be isolated and attenuated completely. In a sequel, the sharpness of kinetic energy relaxation process should not appear anymore.

SUMMARY OF THE INVENTION

An objective of the present invention is to provide an energy attenuating device applied in an electronic system, such as a vehicle braking system to attenuate and dampen a high voltage shock.

To accomplish the objective, the device comprises:

a first variable resistor having positive resistance effect, one end of the first variable resistor serving as a first input pin;

a second variable resistor having negative resistance effect and connected to the first variable resistor in series, one end of the first variable resistor serving as a second input pin;

a variable capacitor connected to the first input pin;

a variable inductor connected the variable capacitor in series, wherein the variable inductor further connects to the second input pin; and a thermopile connected to the variable inductor in parallel.

When a voltage shock occurs across the first input terminal and the second input terminal, an impedance of the thermopile increases so that a shortcut is formed by the first and second variable resistors to allow the current of the voltage shock firstly flows through the first and second variable resistors. The resistance of the first variable resistor subsequently increases due to the positive resistance effect to restrict the current. Therefore, the current subsequently passes through the variable capacitor and the variable inductor. Since the current of the voltage shock alternately passes through either the first and second variable resistors or the variable capacitor and inductor, the voltage shock is attenuated.

DETAILED DESCRIPTION OF THE PREFERRED EMBODIMENT

Figure 1:
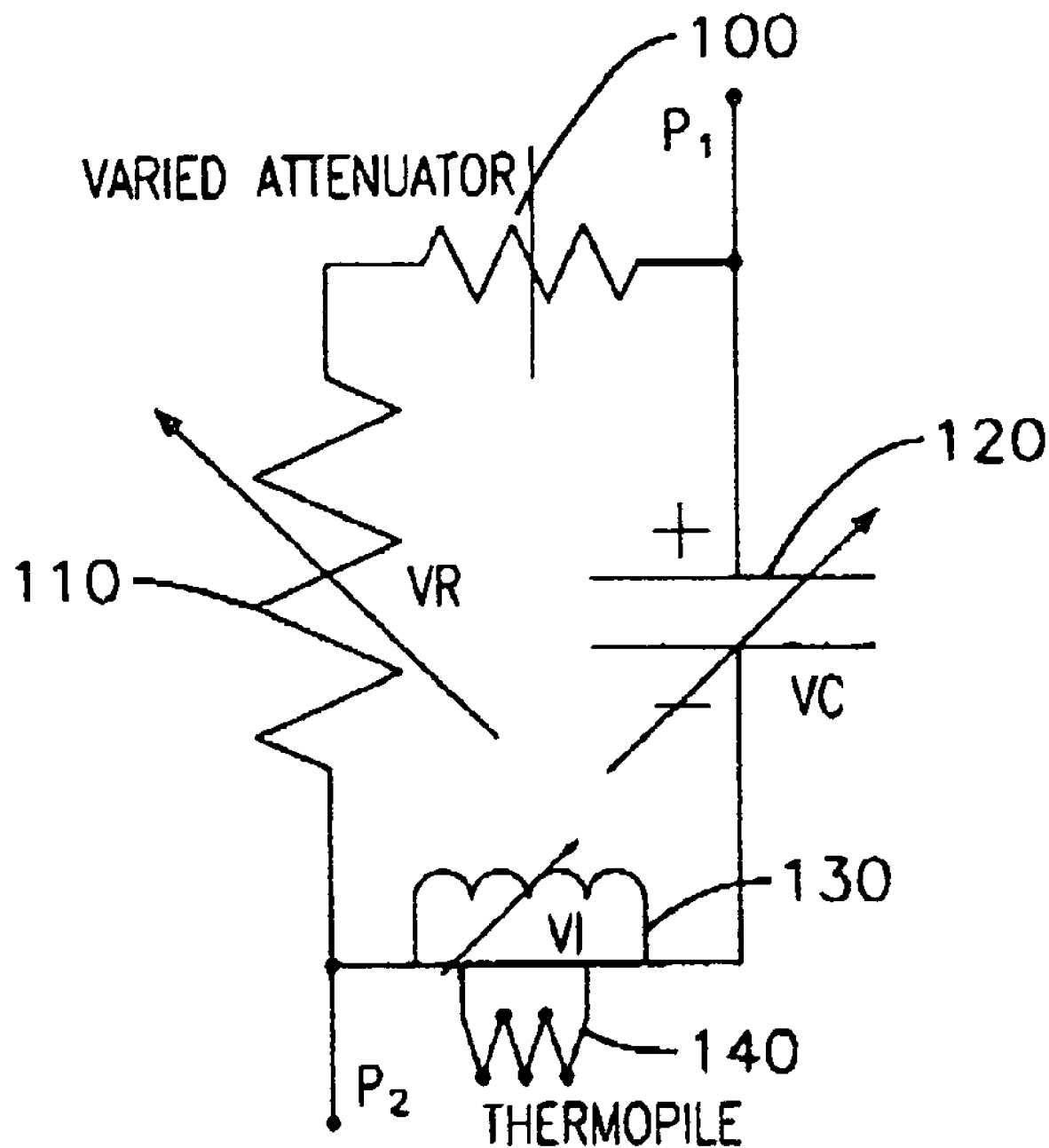
FIG. 1 is a schematic view of an energy attenuating device in accordance with the present invention.

The present invention provides an energy attenuating device to be interconnected with an existed braking system of a vehicle. The energy attenuating device protects the braking system from the voltage shock, and ensures the strength of the magnetic flux is high enough to generate the magnetic reluctance force.

As the braking of the vehicle occurs, the current passing through the magnetic coil can be enlarged to generate a large magnetic reluctance force, thus inducing more powerful braking force. At the same time, a voltage shock accordingly occurs. For the avoidance of the voltage shock, the induced high electromotive force is attenuated or weakened by somehow mechanisms more efficiently. In general, the foregoing mechanisms are called as the dynamic damper. An alternative current is generated and passed through the dynamic damper A virtual power is built up by the dynamic damper and then, the temperature constantly increases to induce the impedance change. When the temperature gets higher, the impedance increases simultaneously so that the impedance can vary with the generated heat but the generated heat is not enough to burn down any system component. In the sense of the electricity, the electrical energy is consumed by the virtual power. The impedance change affecting the dynamic buffer size follows the temperature change.

In a meanwhile, comparing the magnitude of the internal impedance with other external connected devices, for instance, the electrical charging system, the magnitude of the internal impedance is slightly smaller than others. The voltage shock is going to pass a shortcut of the electrical part of the energy attenuating device. That is, the voltage shock is isolated and allocated at the energy attenuating device internally. After the voltage shock is applied, the impedance serves as a fast switch to attenuate the voltage shock. As the temperature increases, the switching frequency (the frequency of turning on and off) is also changed. In circuit of RLC, the frequency is a function of the magnitude of inductance L, the capacitor C, and resistor R. If the frequency is a variable parameter in this circuit, the value of the impedance is no longer a constant value. Totally speaking, the impedance of the system is a function of the temperature variation.

The superabundant energy is buffered in the dynamic buffer zone. After the self-attenuation process in the generator, the peaceable energy can be extracted out and re-entered into an energy storage system, for example, the electrical charging system. The most important point is that smoothly and continuously working for each braking cycle is carried out. Secondly, the dynamic buffer contributing to recycle the energy on braking is straightly worked. In the vehicle braking system, the variation of load is extremely different. If the mechanical-electrical system has no buffer or only has a fixed buffer zone, the mechanical-electrical system is easy to be destroyed by the limiting load occurred. Again, another point should be emphasized is that the buffer size can be regulated automatically and dynamically, so that the buffer in the present invention is called as an adaptive buffer zone. In conclusion, the properties of the present invention include:

1. Highly tolerant voltage and current.
2. Dynamic damping effect.
3. Wide bandwidth of frequency response.
4. Virtual load locating.
5. Adaptive impedance regulation.
6. No strict gradient of temperature.
7. Low cost.
8. Dynamic buffer size generating.
9. No extraneous power consumption.
10. Self attenuation without second shock generation.

With reference to FIG. 1, the structure of the present invention is composed of a variable attenuator (VA) (100), a variable resistor (VR) (110), a variable capacitor (VC) (120) and a variable inductance (VI) (130), where $P_1$ and $P_2$ are input pins. A thermopile (140) coupled to the variable inductance can provide either a positive or negative thermal effect.

The variable attenuator (100), variable resistor (110), variable capacitor (120) and the variable inductance (130) are varied with loads (not shown in FIG. 1) and other impedance contributed by other devices coupled to the attenuating device.

The thermopile (140) serve as a fast switch. The impedance of the thermopile (140) varies with the temperature. For a positive thermal effect type, as the voltage shock occurs and the voltage shock is applied to the thermopile (140), the temperature of the thermopile (140) immediately reaches a high value, A corresponding impedance of the thermopile (140) proportionately also reaches a high value. When the voltage shock is eliminated and the temperature gradually decreases, the impedance of the thermopile (140) returns to a normal status.

In the transition process, how fast the switch can achieve is dependent on the natural frequency of material, i.e, the material of the switch. The switching frequency of the thermopile (140), under 10 GHz, is adopted in the present invention and more particularly related to the material (for example, SiGe, GaAs, InP,). If the gradient of temperature is positive/negative, the switching frequency should be speeded up/slowed down and eventually enter a balance state between temperature change and impedance increment/decrement.

When the voltage shock occurs, the impedance of the attenuating device can be repeatedly self-tuned and adaptively to enter a temperature-impedance balance state. The VR, VC, VI, VA are dynamically determined based on the magnitude of the occurred voltage shock and all can reach a balance state eventually.

For a simple oscillator formed by a resistor, a inductor and a capacitor (RLC) connected in series, the total impedance Z(f) is a function of the excited frequency f, as shown in equation (9).

$$Z(f) = \sqrt{R^2(f) + \left(2\pi fL - \frac{1}{2\pi fC}\right)^2} \quad (9)$$

The equation (9) can be rewritten to a complex form as shown in equation (10). In the complex form, the total impedance can be expressed by frequency, temperature or time (chains rule), as following:

$$z(f) = R(f) + i\left[2\pi fL - \frac{1}{2\pi fC}\right] \quad (10)$$
$$= R(f) + i[X_L + X_C]$$

$$dz = \frac{dR}{df}df + i\left[2\pi L + \frac{1}{2\pi f^2 C}\right]df \quad (11)$$

$$dz = \frac{dR}{df}\frac{df}{dT}dT + i\left[2\pi L + \frac{1}{2\pi f^2 C}\right]\frac{df}{dT}dT \quad (12)$$

and $$dz = \frac{dR}{df}\frac{df}{dT}\frac{dT}{dt}dt + i\left[2\pi L + \frac{1}{2\pi f^2 C}\right]\frac{df}{dT}\frac{dT}{dt}dt \quad (13)$$

or $$dz = \frac{dR}{df}\frac{df}{dT}\frac{dT}{dt}dt + i\left[(2\pi L)df + \frac{df}{2\pi f^2 C}\right] \quad (14)$$

$$= \frac{dR}{df}\frac{df}{dT}\frac{dT}{dt}dt + i[dX_L + dX_C] \quad (15)$$

Therefore, from the equation (14), the term $$\frac{dR}{df}$$

is the resistance variation with respect to the frequency variation (df) and is the primary dominant character for the attenuating device. If $$\frac{dR}{df}$$

is zero but R is not zero, it represents a commonly used normal resistor having a constant resistance value. In fact, there are two types of resistance effects, positive resistance effect (PRE) and negative resistance effect (NRE). If $$\frac{dR}{df} > 0,$$

i.e. the positive resistance effect, the frequency increases faster then the resistance, vice versa. The factor $$\frac{dR}{df}$$

is affected mostly by material. The term $$\frac{df}{dT}$$

is a frequency change rate with respect to temperature. The two terms $$\frac{dT}{dt}$$

and dt are the diffusion rate and the operating period respectively. In other words, the braking system needs a cooling device to perform the $$\frac{dT}{dt}$$

effect. When the braking system continuously operates, the temperature is getting higher and finally the heat will cause a system suspension. This is a terribly unstable saturation and causes a serious damage to the breaking system. Putting on the $$\frac{dR}{df} = \rho_\mu \text{ and } \frac{dR}{df} = \rho_n,$$

the value of $\rho_p$ is significantly larger than $\rho_n$ to provide a critical benefit that the resistance will never convergent to zero. In order to avoid the saturation points, the series-connected scheme of PRE and NRE resistors used in the attenuating device of the present invention such that the total resistance is not zero and never stop simultaneously. The unstable barrier is then totally released. At the same time, the terms $$dX_L 2\pi d \cdot df \text{ and } dX_c = \left(\frac{1}{2\pi f^2 C}\right) df$$

are the inductance change and capacitance change respectively, and both are dependent on the frequency variation $df$. In equation (9), $Z(f)$ is called as the dynamic impedance. The impedance matching is performed by frequency deviation as equation (12) resulted from voltage shock or inrush current. The primary advantage is that the resonance frequency is very sensitive to the temperature. That is, the dynamic impedance matching is totally implemented by frequency variation.

According to FIG. 1 and equation (15), the image part of impedance $dX_C+dX_L$ is represented by VC and VI, wherein the VC could be made of semiconductors with high working voltage or high-energy battery, like ultra capacitors. The varied inductor (VI) can be the system loads, for example, the VI can be the stator coils in the AC alternator. Both the VC and VI are frequency-depended and the induced non-linear system loads. The thermopile totally described by the term $$\frac{df}{dT}\frac{dT}{dt}$$

is contributed from the frequency change and very sensitive to the temperature change, preferably a thermo resistor is adopted. The term of real part of the impedance $$\frac{dR}{df}$$

is triggered by frequency drift and strictly material dependent. For example, using GaAs material, $$\frac{dR}{df}$$

is a positive value but choosing a Tuner diode, $$\frac{dR}{df}$$

is a negative value. In the present invention, the material with a positive $$\frac{dR}{df}$$

is selected to achieve the positive resistance effect (PRE). Alternatively, for the attenuator setting, the term $$\frac{dR}{df}$$

should be a negative effect to cause a shortcut effect that leads the power to firstly pass through. The VR is a positive temperature coefficient to buffer the power so there is no any power leakage.

According to the Kirchhoft's voltage rule, the characteristic values of the equation (16) are $\lambda_{1,2}$.

$$\frac{d^2 v}{dt^2} + \frac{R}{L}\frac{dv}{dt} + \frac{1}{LC} v = 0 \quad (16)$$

The two characteristic values $\lambda_{1,2}$ as expressed by the equation $$\lambda_{1,2} = \left(-\zeta \pm \sqrt{\zeta^2 - 1}\right)\omega_0, \text{ where } \omega_0 = \frac{1}{\sqrt{LC}},$$

and the damping ratio $\zeta$ is denoted in equation (17).

$$\zeta = \frac{RC}{2}\omega_0 \quad (17)$$

Comparing equation (17) with the real part of equation (11), the common term is resistance R. The resistance R is a function of frequency $f$, $$R=R(f)$$

Therefore, the equation (17) can be rewritten to the following equation with a variable damping coefficient $\zeta(f)$ $$\zeta(f) = \left(\frac{C\omega_0}{2}\right) R(f)$$

Therefore, equation (16) is parameterized by the frequency $f$.

The impedance shown in equation (10) is frequency dependent. The frequency is determined by the material and excited by the amplitude of power input. The most important feature is that the attenuator (NRE) and PRE with VC and VI interconnection initially create a second-order RLC oscillator. Hence the current is damped and oscillated between the varied attenuator to VR, and finally the amplitude of the shock voltage and inrush current are damped and attenuated dynamically. It can be realized that the impedance of equation (10) can perform dynamic impedance matching for the varied loads. The impedance is adaptively dependent on the temperature, amplitude of power and so on.

Application of the Present Invention

Figure 2:
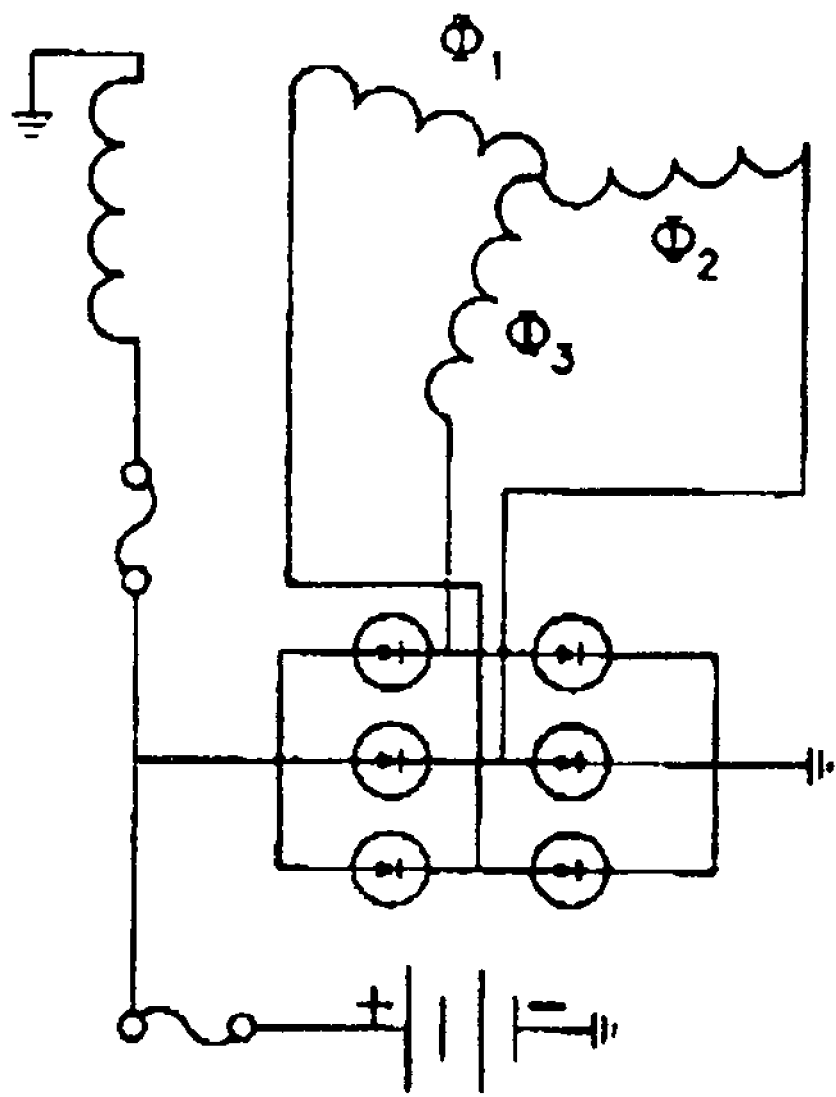
FIG. 2 is a schematic view of a conventional AC generator.
Figure 3:
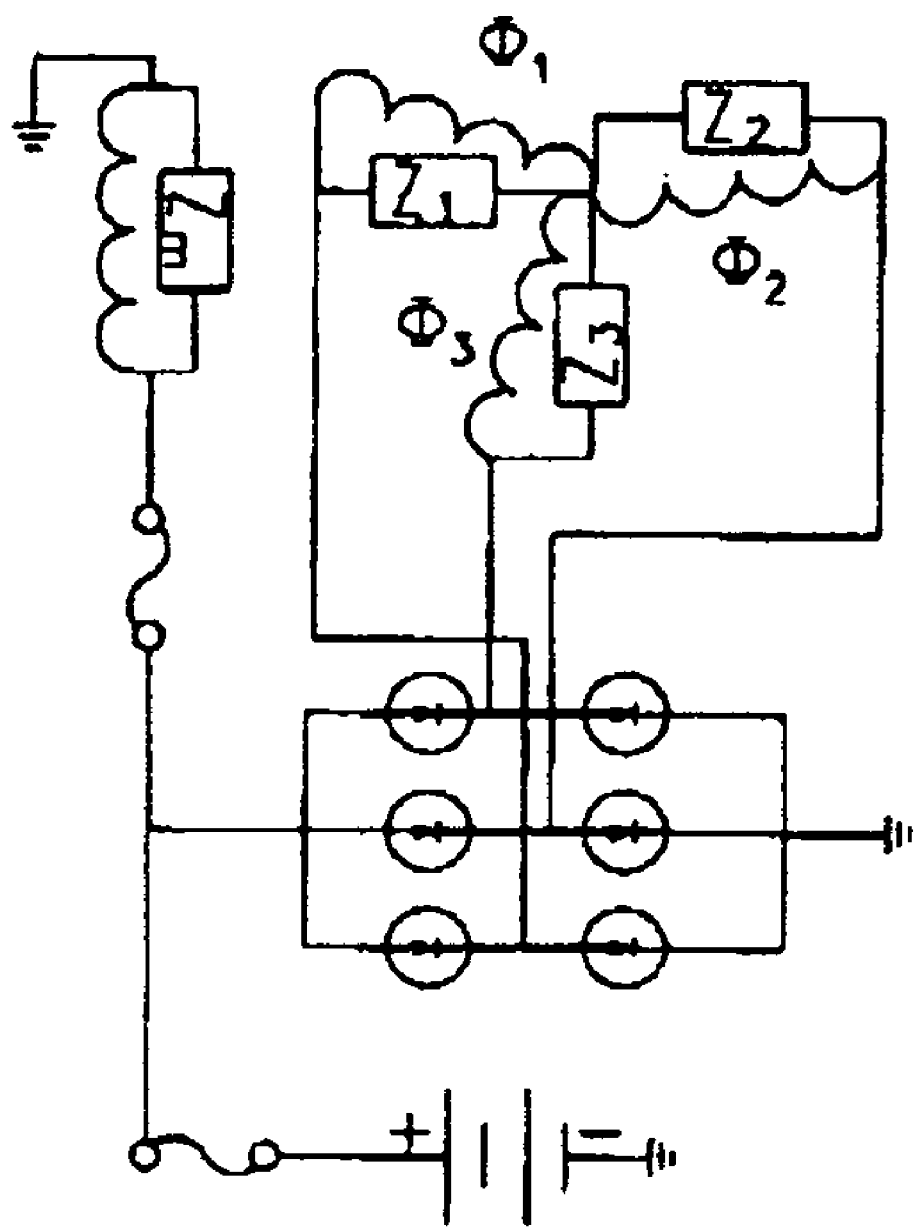
FIG. 3 is a schematic view of an AC generator incorporated with the energy attenuating device in accordance with the present invention.

A conventional three-phase AC generator is as shown in FIG. 2. The difference of phase angles between $\square_1$ and $\square_2$, $\square_2$ and $\square_3$ or $\square_3$ and $\square_1$ is $2\square/3$.

Figure 4:
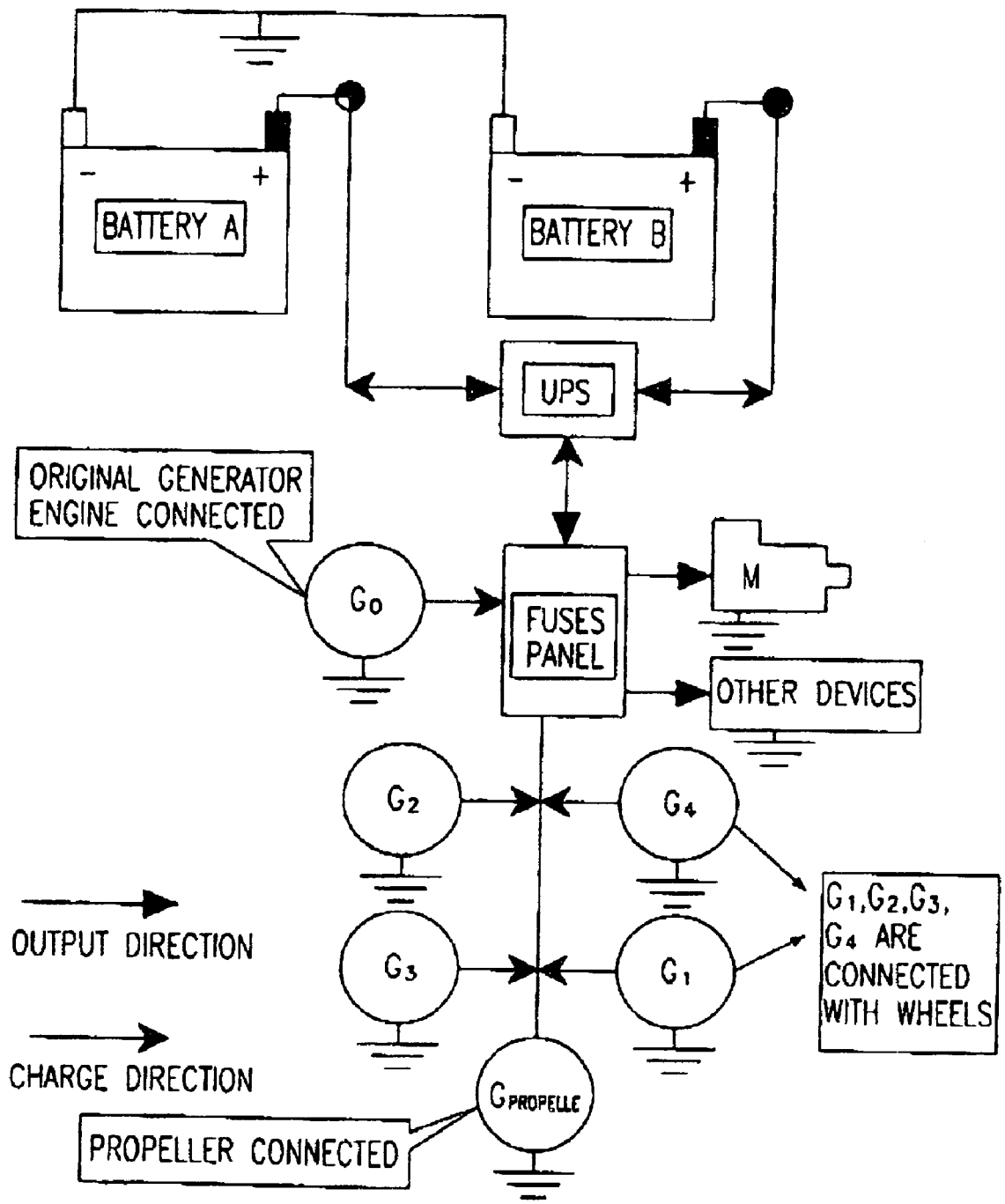
FIG. 4 is a schematic view of a braking system of a vehicle incorporated with the energy attenuating device in accordance with the present invention.

When the energy attenuating device is embedded into 3-phase AC generator, the system is modified as shown in FIG. 4.

The primary difference between the conventional and modified AC generators G is that the energy attenuating device components $Z_1$, $Z_2$ and $Z_3$, i.e. dynamical impedance, are respectively coupled to the coils of the AC generator G. Another energy attenuating device component $Z_m$ is used to attenuate the higher-order induced E.M.F. for the input of the magnetic coil damage. At the same time, the energy attenuating device components ($Z_1$, $Z_2$, $Z_3$, and $Z_m$) lead induced high E.M.F. into the stator and rotor, and induces a self-attenuation to re-start up again and again. Take notice that the amount of the dynamical impedance is equal to the amount of phases of the stator. Again, the magnitude of all of dynamical impedance is dependent on the real problems requirement and determined dynamically.

Finally, a complete energy recycling and electric-magnetic auxiliary braking system is shown in FIG. 4.

In FIG. 4, six generators $G_0$, $G_1$, $G_2$, $G_3$, $G_4$ and $G_5$ are connected with a respective energy attenuating device. $G_0$ is driven by power source (engine), and $G_1$, $G_2$, $G_3$, $G_4$ are respectively driven by the four wheels (Front-Right, Front-left, Back-Right, Back-Left sides) of a vehicle.

Without loss of direction on braking concentrating, $G_5$ is the primary energy attenuating device type generator driven by the propeller for the auxiliary braking and energy recycling on braking. We are able to increase the numbers of generator for the heavy load case.

In order to avoid over charging problem, incorporating the circuit of the UPS (uninterruptible power supply) in this area can help us to switch which battery (A or B) to store recycling electrical energy in real-time.

The principle of the energy attenuating device

Figure 5:
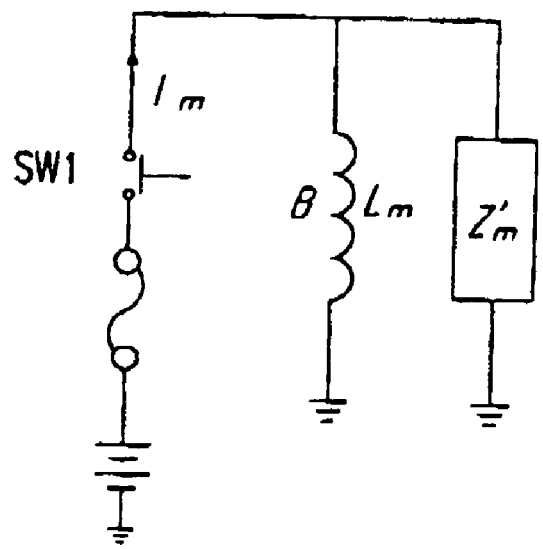
FIG. 5 is a schematic view showing the magnetic coil in the AC generator with energy attenuating device.
Figure 6:
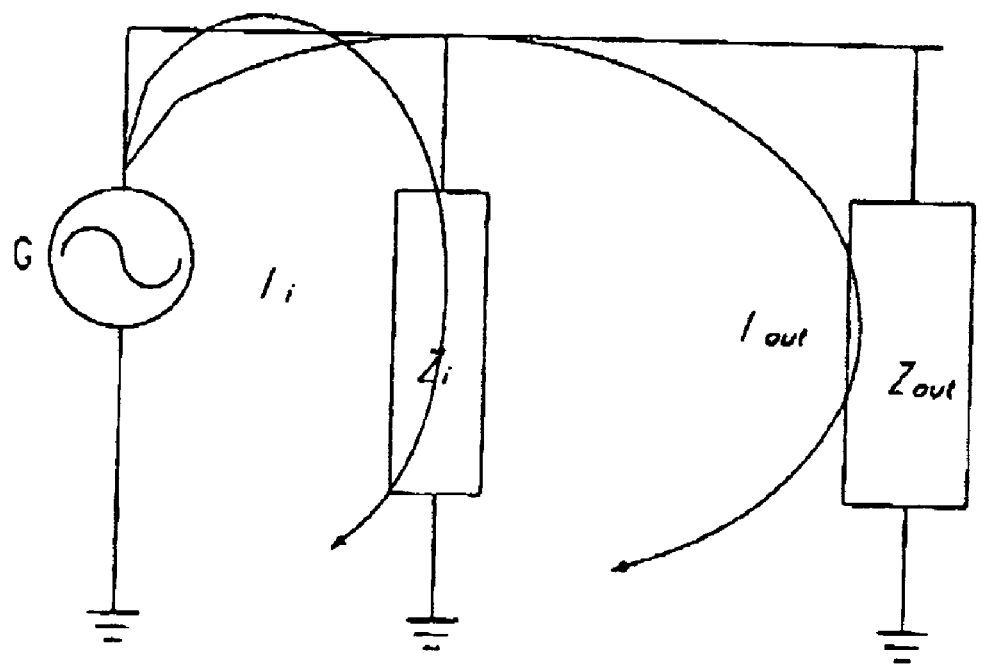
FIG. 6 is a schematic view showing the internal impedance ($Z_i$) and an external ($Z_{out}$) impedance of a braking system.

The working principles of the energy attenuating device are concluded as the followings:

1. As shown in FIG. 5, SW1 on, the current $I_m$ passes through the magnetic coil with inductance $L_m$ to generate flux B. The strength of the flux B is proportional to the product of the current and the loops of the coil, $B \propto I_m N_m$. The value of the impedance is $Z_m$ and $Z'_m$ simultaneously. Also, as shown in FIG. 6, an electrical-magnetic braking system integrated with the energy attenuating device now is working on. When the input current $I_m$ enlarged, the braking effect is enhanced. To this end, the impedance $Z_1$ is always slightly smaller than the external impedance $Z_{out}$ so that $I_{out}$ is smaller than the current $I_i$. Because the energy attenuating device in the braking system is temperature dependent, the current passed through $Z_1$, $Z_2$, $Z_3$ and the switching frequency is moving to high. Comparing the internal impedance $Z_i$ with $Z_{out}$, $Z_i$ is smaller than the $Z_{out}$. Here the $Z_i$ is a fast switch. When this switch is on, $Z_i$ forms a shortcut for the voltage shock. On the contrary, when this switch is off, the shock is going to fan out. At the same time, the switch changes the conductive status; the shortcut effect is generated again. The statuses between on and off of the switch repeatedly interchange. For the purpose of fast switching between on/off, the voltage shock is isolated and stays at the $Z_i$.

Figure 7:
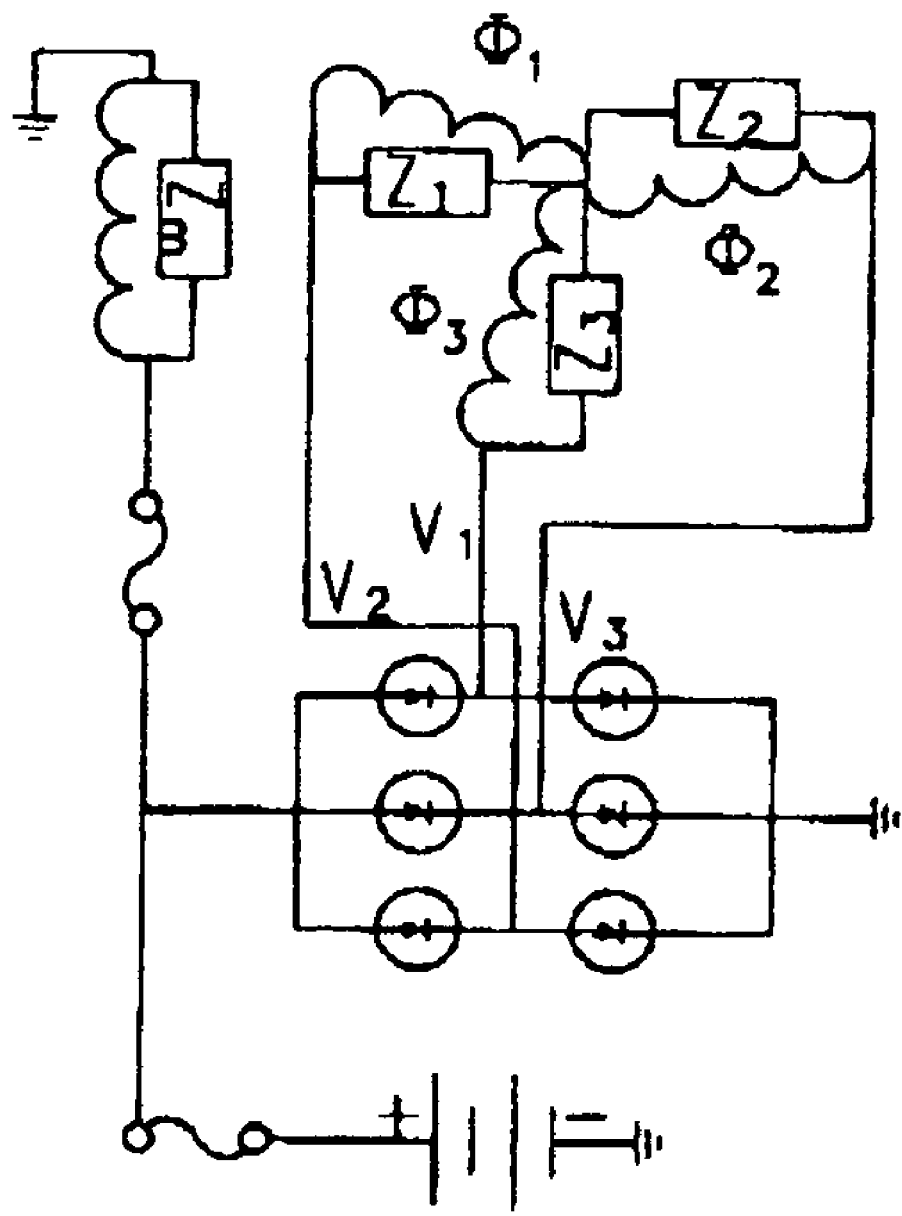
FIG. 7 is a schematic view showing the voltage shocks V1, V2, and V3 occurred in the AC generator with the energy attenuating device.

2. When the voltage shocks $V_1$, $V_2$, $V_3$ occur, as shown in FIG. 7, the high temperature is built up and the gradient of temperature is fed into the stator coil of the energy attenuating device's AC generator and then determining the value of the impedance and the switch frequency. When the kinetic energy is transferred to the electrical energy, the least heat energy is converted to the on and off actions and regulating the magnitude of the impedance. The superabundant energy is recycled in the electrical-magnetic braking system only, no energy loss. This is a dynamic damper effect. The shock is attenuated by this dynamic damper.

3. If the value of $Z_i$ is always dynamically smaller than the $Z_{out}$, firstly the shock is directly across the $Z_i$ at the original state (0-state), the current $I_i^0$ is firstly passed through and the high temperature field is then built, the magnitude of impedance $Z_i$ becomes a large value and the state of $Z_i$ has changed to 1-state (high temperature status), the current $I_i^1$ becomes a smaller value than $I_i^0$. In fact, once the electrical energy is led out to the charging system immediately and the temperature is getting down. As the temperature gradient being a negative value, the status (1-state) right now changes to the original status (0-state), without any current across $Z_{out}$. The state changes between the 0-state and 1-state are no stop until the shock removed. We denote these states transition with a very wide operating frequency band. After all, the shock produced on braking is recycled.

4. From the shock isolation, attenuation and finally recycling to the electrical charging system, all of them are dynamic and adaptive self-balancing processes. It is truly without any digital or analog controller add-on.

What is claimed is:

1. An energy attenuating device with the dynamically adaptive damping feature, the energy attenuating device comprising:

a first variable resistor having positive resistance effect, one end of the first variable resistor serving as a first input pin;

a second variable resistor having negative resistance effect and connected to the first variable resistor in series, one end of the first variable resistor serving as a second input pin;

a variable capacitor connected to the first input pin;

a variable inductor connected the variable capacitor in series, wherein the variable inductor further connects to the second input pin; and a thermopile connected to the variable inductor in parallel;

wherein when a voltage shock occurs across the first input terminal and the second input terminal, an impedance of the thermopile increases so that a shortcut is formed by the first and second variable resistors to allow the current of the voltage shock firstly flows through the first and second variable resistors; the resistance of the first variable resistor subsequently increases due to the positive resistance effect to restrict the current, whereby the current subsequently passes through the variable capacitor and the variable inductor; since the current of the voltage shock alternately passes through either the first and second variable resistors or the variable capacitor and inductor, the voltage shock is attenuated.

2. A vehicle braking system using the energy attenuating device as claimed in claim 1, the vehicle braking system comprising:

at least one AC generator having multiple coils, wherein each coil is connected to the two input pins of a respective energy attenuating device;

when a brake of the vehicle occurs, the AC generator produces an electrical-magnetic braking force with a voltage shock, meanwhile each energy attenuating device serves as a high-frequency operated dynamic damper to attenuate and dampen the voltage shock so as to prevent the vehicle braking system from being damaged.

3. The vehicle braking system as claimed in claim 2, wherein each energy attenuating device is a temperature-depended device so that the impedance of the each energy attenuating device varies with the temperature to adapt the voltage shock.

4. The vehicle braking system as claimed in claim 3, wherein the electrical-magnetic braking force is recycled in an electrical charging subsystem in the vehicle braking system.

5. The vehicle braking system as claimed in claim 4, wherein the AC generator is driven by a propeller of the vehicle or a wheel of the vehicle.

6. The vehicle braking system as claimed in claim 4, wherein the electrical charging subsystem comprises a UPS and batteries.

* * * * *